Jan. 22, 1952 W. W. HALLINAN 2,583,423
HIGH-PRESSURE FILTER
Filed July 30, 1949 2 SHEETS—SHEET 1
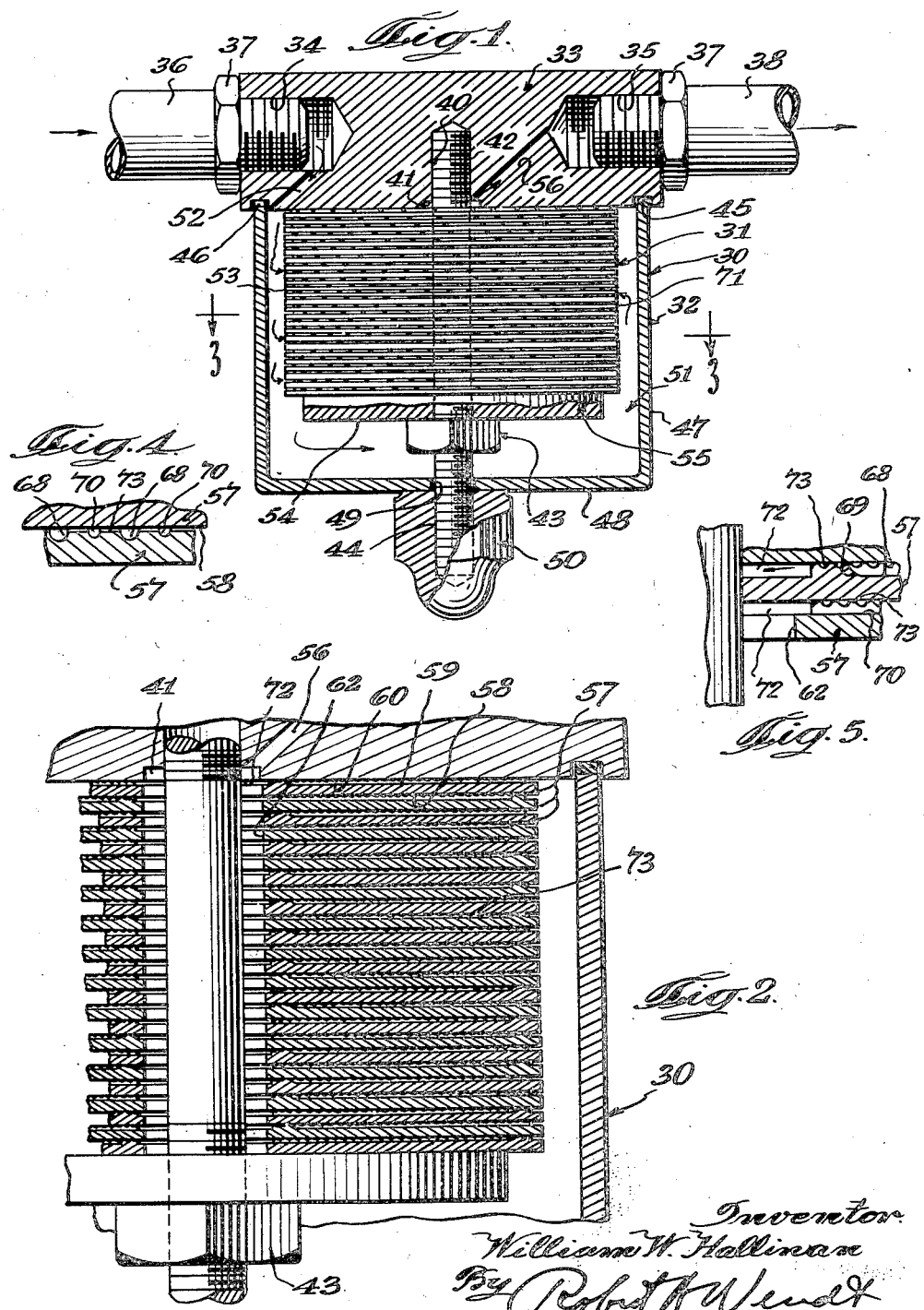
Inventor
William W. Hallinan
By Robert H. Wendt
Attorney

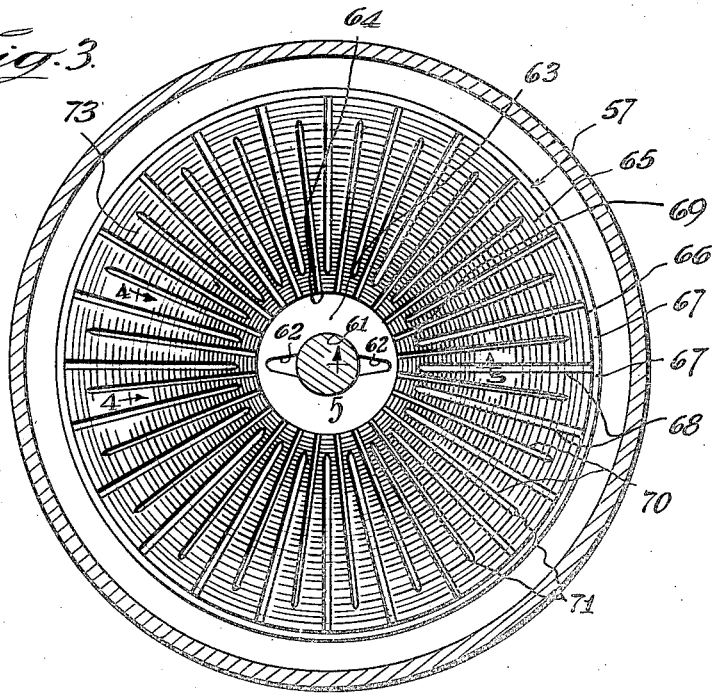
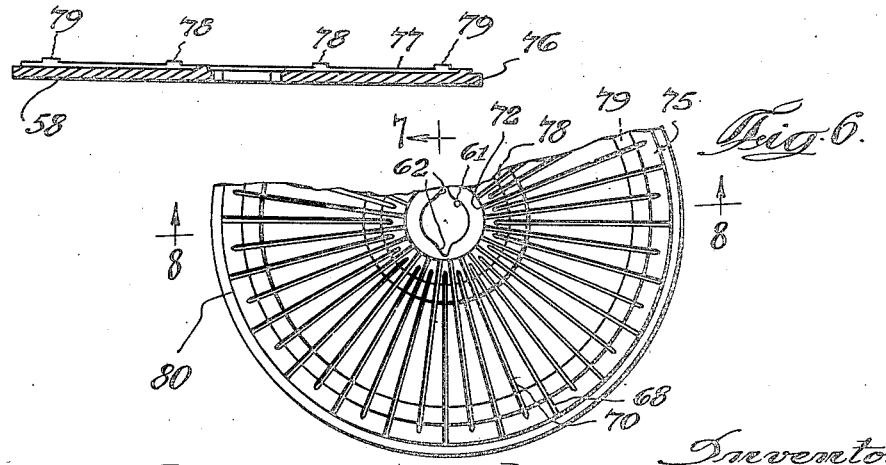
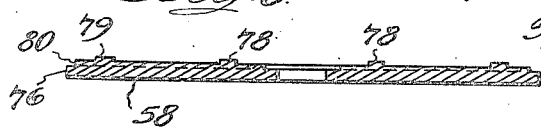

Patented Jan. 22, 1952

2,583,423

UNITED STATES PATENT OFFICE 2,583,423

HIGH-PRESSURE FILTER

William W. Hallinan, Racine, Wis.

Application July 30, 1949, Serial No. 107,811

9 Claims. (Cl. 210—185)

The present invention relates to high pressure filters and filter control systems, and is particularly concerned with the provision of improved filters and systems which are adapted to be used in oil burner lines between the nozzle and the outlet of the pressure pump, for accomplishing a more efficient filtering action of the liquid fuel when it is under high pressure.

The filters of the prior art, which are not rigid, are provided with parts which spring or move under high pressure or as the pressure is applied; and this movement of the parts of the filter tends to loosen particles of dirt that have been previously collected by the filter.

One of the objects of the invention is to produce an improved filter which will operate under high pressure, and which is rigid in all of its parts, so that the parts will not spring or move as pressure is applied, and so that it will hold all particles of dirt that have been collected and will operate efficiently under all pressures, from zero to maximum working pressure.

The filters of the prior art are not represented by their makers as being capable of protecting nozzles of small capacity because the small capacity nozzles have smaller grooves or openings; and so far as I am aware, there is no manufacturer who claims that his filter is capable of protecting the smallest types of nozzles, such as those which deliver one-half gallon per hour.

Another object is to produce a high pressure filter that will positively protect high pressure atomizing nozzles from becoming clogged with dirt or foreign substances, even down to the smallest nozzles that are used, which have a capacity of one-half gallon per hour.

A further object of the invention is to produce an improved filter of the class described which is capable of being readily and easily cleaned.

Another object of the invention is to provide such a filter that the ordinary household burner may operated without nozzle service, even when the smallest nozzle sizes are used, for the entire heating season, instead of requiring cleaning and service from two to four times per season, as is the case at the present time.

Another object of the invention is to provide an improved filter core which has many times more dirt collecting and storage surface than the disc filters of the prior art now on the market, which disc filters of the prior art have only the outside of their disc core to provide a filtering area; and it is a further object to build such a filter core of such small dimensions that it may be placed in a very small casing, while still providing much more filter area than any of the prior art devices.

It is a further object of the invention to build an improved filter core of the class described having its various filtering feed channels and outlet channels so constructed that they can be formed complete upon either a punch press or a coining press.

Another object of the invention is to build a high pressure filter, all of the parts and assembly of which will be inexpensive to manufacture and sell.

Another object of the invention is to build an improved filter which is adapted for mass production; and under mass production conditions each one of the filter cores coming off the line will be an exact duplicate of the others, so that there will be uniformity of the new results accomplished by all filters.

Other objects and advantages of the invention will be apparent from the following description and the accompanying drawings, in which similar characters of reference indicate similar parts throughout the several views.

Referring to the drawings, of which there are seven sheets;

Fig. 1 is an axial sectional view taken through an improved filter embodying the invention and showing the core in elevation;

Fig. 2 is a fragmentary sectional view taken on the same plane through both the housing and the core to show the details of construction on a larger scale;

Fig. 3 is a horizontal sectional view taken on the plane of the line 3—3 of Fig. 1, looking in the direction of the arrows, and showing the grooved surface of one of the filter elements;

Fig. 4 is a fragmentary sectional view, taken on the plane of the line 4—4 of Fig. 3, looking in the direction of the arrows;

Fig. 5 is a fragmentary sectional view, taken on the plane of the line 5—5 of Fig. 3, looking in the direction of the arrows;

Fig. 6 is a fragmentary sectional view, similar to Fig. 3, of a modification, which differs from Fig. 3 in that the filter discs have their surfaces provided with annular lands; but the surfaces between the grooves are not provided with the multiple concentric circular grooves which are present in Fig. 3;

Fig. 7 is a sectional view, taken on the plane of the line 7—7 of Fig. 6, but differing from Fig. 6 in that the complete cross section of the disc is shown on this plane;

Fig. 8 is a sectional view, taken on the plane of the line 8—8 of Fig. 6, looking in the direction of the arrows.

Referring to Figs. 1 to 5, these are views showing one of the simplest forms of my improved filter. In these figures 30 indicates in its entirety the improved filter, which includes a core 31, comprising a stack of filter elements enclosed in a suitable housing 32, which is mounted upon a base 33.

The base 33 may consist of a substantially cylindrical metal member which is thick enough to permit the formation of a pair of threaded inlet and outlet bores 34, 35, respectively, so that the filter may be connected in an oil line 36 by means of standard fittings 37.

The housing body 33 is preferably formed with an axially located threaded bore 40 and has surrounding this bore an annular groove 41 for collecting filtrate that passes through the core. The threaded bore 40 is adapted to receive the threaded end 42 of a screw bolt, which preferably has a noncircular enlargement 43 adjacent its other threaded end 44.

The enlargement 43 may be an integral part of the bolt or it may be a nut threaded on the end 44. The housing base 33 is provided with an annular groove 45, preferably of rectangular shape, which is located concentric to the axis of the bolt 42 and is of such diameter that groove 45 is adapted to receive an annular edge of the housing member 32. The groove 45 preferably has a suitable gasket 46, which is compressed in the groove by the housing member 32, making an oil-tight joint.

The housing member 32 comprises a substantially cylindrical cup, having the cylindrical side wall 47 and the circular end wall 48. The circular end wall 48 has a centrally located hole 49 for passing the threaded end 44 of the bolt, and a cap nut 50 may be threaded on the end 44 and may engage the end wall 48 of the housing member to secure the housing member 32 to the base 33, forming a chamber 51 for receiving the dirty oil which is to be filtered.

When the core 31 is in the chamber 51, there is an annular space surrounding the core; and this annular space communicates with the inlet port 34 by means of a diagonal conduit 52 in the base 33. Thus the dirty oil coming in at the port 34 has access to the outside of the core, not only at its cylindrical side, indicated at 53, but also has access to the end of the core 31 at the outside surface 54 of the end plate 55.

The annular filtrate collecting space 41 communicates with the outlet port 35 by means of a diagonally extending bore 56.

Referring now to Figs. 2, 3, 4, and 5, the core 31 consists of one or more, preferably of a multiplicity of the filter elements 57. These filter elements are shown in plan in Fig. 3; and they preferably consist of sheet metal discs of suitable metal, each disc having a flat and plane lower side 58 and a grooved upper side 59.

The flat side of each filter element 57 is adapted to engage the grooved side of the next adjacent filter element; and the uppermost filter element 57 (Fig. 2) is also adapted to engage the flat and plane inner surface 60 on the base 33.

Referring to Fig. 3, each of the filter elements 57 is preferably circular in shape and is provided with a central aperture 61, which is substantially circular and adapted to fit over the bolt 42, but which also communicates with the radially extending grooves 62, these V grooves 62 being diametrically opposite to each other.

Each disc is preferably formed with a centrally located plane surface 63 surrounding the aperture 61 and grooves 62 and bordered by the circle 64. Part 63 of the disc is actually a part which is reduced in thickness by a stamping operation so that the remainder and outer portion of the disc element 57 is thicker than the central flange 63.

The circle 64 which borders this flange also indicates a substantially cylindrical shoulder at the border of the thicker outer portion 65 of the filter element. This thicker portion extends to the circle 66, which also represents the border of an annular thin flange portion 67, which is thicker than the portion 65.

The circle 66 (Fig. 3) also indicates a cylindrical outer edge of the thicker portion 65. The top of each filter element 57 is formed with a plurality of grooves of two types. The grooves 68 are grooves for dirty oil, and they lead inwardly from the cylindrical edge wall 66, but terminate at 69 short of the inner edge 64 of the thicker portion 65.

In addition to the grooves 68, as described, the top face of each disc or filter element 57 is also provided with the grooves 70, which start at the annular inner edge 64 and extend radially outwardly, terminating at 71 at a point spaced from the outer edge 66; and the grooves 70 are grooves for filtrate or filtered oil.

The dirty oil grooves 68 are preferably located alternately between each pair of clean oil grooves 70 so that the oil to be filtered comes in at the grooves 68 and then moves laterally between the discs to the grooves 70.

In some embodiments of the invention the portion 65 has its face perfectly flat and plane, and this plane surface 65 engages the bottom of the next adjacent disc, which is also flat and plane. In such cases the oil filters by going between the two adjacent flat surfaces of the discs from any groove 68 for dirty oil to any groove 70 for clean oil.

It will be noted that the grooves 68 for dirty oil communicate with the space 51 surrounding the core 31; and these grooves 68 appear on the outside of the core (Fig. 1) as apertures 71.

The filtrate grooves 70 communicate with the annular space which is present between the discs by virtue of the fact that the central flange portion 63 is thinner; and these annular spaces have been indicated in Fig. 2 by the number 72. The annular spaces 72 communicate with the grooves 62 in the discs and filter elements 57; and the grooves 62 extend longitudinally of the bolt 42 and communicate with the annular filtrate collecting space 41.

This in turn communicates with the diagonal conduit 56 leading to the outlet port 35.

It will be observed that the filter disc elements 57 of Fig. 3 have twenty-five of the dirty oil grooves 68 and a similar number of the clean filtrate grooves 70; and the combined length of these grooves presents an extended filtering area as contrasted with the devices of the prior art, where the filter area was presented only at the outer edge of the core.

It should be noted that the cracks between the filter elements 57 also present filtering surfaces at the edge 66, which is adjacent the outside of the core 31; and the dirty oil which is in the space 51 also has access to the filtrate grooves 71 by passing through the cracks between the discs from the outer edge 66 to the ends 71 of these grooves.

The filter elements 57 are arranged in a stack and threaded upon the bolt 42; and their grooved faces and flat surfaces are brought into tight engagement with each other by means of the noncircular enlargement 43, which engages an end plate 55 that holds the filter discs flatly against each other.

The threaded end of the bolt 42 threaded into the bore 40 produces sufficient compression to hold all the discs tightly against each other.

The end plate 55 in Fig. 1 may consist of a thick metal plate with a central bore for receiving the bolt 42.

In the embodiment of Figs. 1 to 3, however, the faces 65 of the filter element 57 are preferably provided with a multiplicity of concentric circular grooves 73, these grooves being circular and concentric when viewed in plan.

The grooves 73, like the grooves 68 and 70, are all preferably partially cylindrical in cross section, or of V shape with rounded corners, as such grooves can be formed by means of a suitable die in a coining or stamping operation; and the die will stand up for a much longer period of time if the corners are rounded.

The ends of the concentric circular grooves 73 open into both the dirty oil grooves 68 and the clean filtrate grooves 70; and the concentric circular grooves 73 are preferably minute in their proportions, being made as much as is necessary to stop the solid matter in the dirty oil, while passing the liquid through.

Such concentric circular grooves 73 may be made of one one-thousandth of an inch in depth or a few thousandths, such as two or three or four, depending upon the size of the particles which it is sought to remove. In some cases they may be a fraction of a thousandth of an inch in depth, and the solid material is held and filtered out at the open ends of the grooves 73, which are presented in the dirty oil radial grooves 68.

Referring to Fig. 4, this is a fragmentary sectional view, taken on the line 4—4 of Fig. 3, which may be considered as being a cylindrical element. In this cross section the concentric circular grooves 73 are smallest and can be seen passing transversely to the largest dirty oil grooves 68 and to the smaller filtrate grooves 70. Here also the grooved face of an element 57 can be seen engaging the plane flat lower surface 58 of an adjacent filter element 57.

Referring to Fig. 5, this is a cross-sectional view taken on a radial plane, and the plane 5—5 of Fig. 3 passes radially down the axis of a dirty oil groove 68. The dirty oil groove 68 terminates at 69 adjacent to the annular collection space 72, while the clean filtrate groove 70 of the next lower filter element 57 communicates with the annular collection space 72.

The collection grooves 62 happen to be shown in the lower filter element 57 (Fig. 5); and it will be seen that it is unnecessary to effect an alignment of the grooves 62 of one plate with the other plates.

By means of the annular collection spaces 72 the through grooves 62 in each filter element 57 can communicate with the through grooves 62 in every other filter element 57.

In Fig. 2 the grooves 62 are shown in alignment with each other in the respective filter elements 57; but in actual practice they would not be in alignment and need not be in alignment.

Referring again to Fig. 5, the wavy line 73 in each case indicates the concentric circular minute grooves whose proportions vary in thousandths of an inch as desired, and which actually pass the filtered liquid from the dirty oil grooves 68 to the clean oil grooves 70. These wavy lines are also seen at 73 in the enlarged cross section of Fig. 2.

The course of the liquid to be filtered will be apparent from the following description, but is briefly outlined as follows. The oil to be filtered comes in the pipe 36 from the pressure side of the oil pump. It enters the port 34 of the filter and passes down the diagonal conduit 52 into the housing member 32, which has a space 51 surrounding the core 31.

The oil then passes into the circular side wall of the core 31 at the cracks between the discs and finds its way directly to the clean oil grooves 70 from the outer cylinder surface 53. In addition to this surface, the oil passes in the apertures 71, which are presented between the edges of the discs by the open ends of the dirty oil grooves 68.

The oil fills these dirty oil grooves 68 and at the ends 69 of those grooves it may again pass radially into the space 72 between the thinner flanges 63. The vastly greater filter area is provided by the edges of the dirty oil grooves 68, where the oil passes between the plates or filter elements when they are plane, or it passes into the concentric circular grooves 73, whose proportions are very minute and are in the order of one or more thousandths of an inch. There the solid material is held up at the edges of the dirty oil grooves 68; and the clean, filtered oil passes over between the metal discs into the clean oil grooves 70 in the form of a filtrate.

These grooves 70 communicate directly at their inner ends with the annular spaces 72 between the thinner flanges 63; and these communicate with the through grooves 62. Thus the filtrate which surrounds the bolt 42 may find its way along the bolt to the annular collection space 41, which communicates with the diagonal conduit 56 leading to the outlet port 35.

The present filter preferably has its plates made of sheet metal; but in some embodiments of the invention these plates may be made or stamped or coined or molded out of a suitable phenolic condensation product or any modern plastic which is not affected by the liquid to be filtered and which is capable of being coined or molded. Among such modern plastics that may be used are cellulose acetate, acrylic resins, vinyl resins, or the like.

Referring to Figs. 6, 7, and 8, 75 indicates a modified form of filter element or disc in which similar parts have been given similar numbers. This disc again has the flat lower surface 58, and it is circular in shape, having a cylindrical edge 76. The upper surface of the disc is generally flat and plane, and indicated at 77; but it has projecting from it a pair of annular lands 78, 79.

These annular lands 78 and 79 determine the spacing of the flat surfaces 77 on the top of the disc from the flat and plane bottom 58 of the disc. The disc 75 has the same substantially circular aperture 61 with the diametrically opposite grooves 62 so that it is adapted to receive the bolt 42 and still have the grooves extending longitudinally of the bolt to conduct filtrate.

This disc is again provided with the same coined grooves 68 and 70. The grooves 68 extend to the outer edge of the disc, where it has a rabbeted recess, being bounded by the circular edge portion 80 of smaller diameter than the main edge 76. The grooves 68 are thus grooves for the dirty oil; and they extend to a point short of the annular space 72, similar to that previously described.

Thus the dirty oil may enter the grooves 68, but it has to pass laterally from said grooves to get into the filtrate grooves 70. The filtrate grooves extend all the way into the annular space 72 and communicate with the grooves 62. They are blocked at their outer ends because the grooves 70 terminate short of the circular edge 80; but some dirty oil may filter between the land 79 and the bottom 58 of each adjacent disc.

The height of the lands 78, 79 may be in the nature of one or more thousandths of an inch or a fraction of a thousandth so that the flat surface 77 between the radial grooves 68 and 70 is spaced from the bottom of the next adjacent disc by only a thousandth of an inch or a few thousandths.

It is the height of the lands 78 and 79 that determines the width of the filtering slots in this embodiment; and the disc does not have the peripherally extending grooves 73 previously mentioned with respect to Fig. 1.

It will thus be observed that I have invented a plurality of different forms of improved filter elements of the rigid type, which provide a greatly extended filter area as compared with any of the devices of the prior art.

The filtering conduits which are provided by means of grooves between plates may be made very small because they are formed by means of dies in coining operations; and thus a satisfactory filter may be provided for low capacity installations for which there are now no satisfactory filters on the market.

The present filters are easily cleaned by merely separating the stack of discs and other parts and washing them in water, under a faucet, which provides sufficient water so that the dirt is immediately carried away.

While I have illustrated a preferred embodiment of my invention, many modifications may be made without departing from the spirit of the invention, and I do not wish to be limited to the precise details of construction set forth, but desire to avail myself of all changes within the scope of the appended claims.

Having thus described my invention, what I claim as new and desire to secure by Letters Patent of the United States, is:

1. A filter element for oil filters or the like to be used in a stack with similar elements against a supporting base, the base and all elements having a plane backing surface for engagement with the opposite sides of the elements, the said element comprising a rigid metal member provided with a multiplicity of inwardly extending grooves for dirty liquid to be filtered, the said grooves extending from the outer edge but terminating short of a central through conduit in said element, and the said element also having a plurality of outwardly extending filtrate grooves extending from said central through conduit and terminating short of the outer edge of the element, all of the said grooves forming conduits when the discs are stacked in engagement with each other, and the base and the liquid being filtered by passing laterally from the dirty liquid grooves to the filtrate grooves.

2. A filter element for oil filters or the like to be used in a stack with similar elements against a supporting base, the base and all elements having a plane backing surface for engagement with the opposite sides of the elements, the said element comprising a rigid metal member provided with a multiplicity of inwardly extending grooves for dirty liquid to be filtered, the said grooves extending from the outer edge but terminating short of a central through conduit in said element, and the said element also having a plurality of outwardly extending filtrate grooves extending from said central through conduit and terminating short of the outer edge of the element, all of the said grooves forming conduits when the discs are stacked in engagement with each other, and the base and the liquid being filtered by passing laterally from the dirty liquid grooves to the filtrate grooves, the said grooves being dents in the surface of the element and having a minute depth for catching the smallest particles of solid material.

3. A filter element for oil filters or the like to be used in a stack with similar elements against a supporting base, the base and all elements having a plane backing surface for engagement with the opposite sides of the elements, the said element comprising a rigid metal member provided with a multiplicity of inwardly extending grooves for dirty liquid to be filtered, the said grooves extending from the outer edge but terminating short of a central through conduit in said element, and the said element also having a plurality of outwardly extending filtrate grooves extending from said central through conduit and terminating short of the outer edge of the element, all of the said grooves forming conduits when the discs are stacked in engagement with each other, and the base and the liquid being filtered by passing laterally from the dirty liquid grooves to the filtrate grooves, the said element also having a multiplicity of concentric circular grooves in the same surface as the grooves already mentioned, and the concentric grooves forming filtering paths from dirty oil grooves to filtrate grooves.

4. A filter element for oil filters or the like to be used in a stack with similar elements against a supporting base, the base and all elements having a plane backing surface for engagement with the opposite sides of the elements, the said element comprising a rigid metal member provided with a multiplicity of inwardly extending grooves for dirty liquid to be filtered, the said grooves extending from the outer edge but terminating short of a central through conduit in said element, and the said element also having a plurality of outwardly extending filtrate grooves extending from said central through conduit and terminating short of the outer edge of the element, all of the said grooves forming conduits when the discs are stacked in engagement with each other, and the base and the liquid being filtered by passing laterally from the dirty liquid grooves to the filtrate grooves, the said element being circular in shape and formed at its center with a through bore for receiving a supporting member for the stack.

5. A filter element for oil filters or the like to be used in a stack with similar elements against a supporting base, the base and all elements having a plane backing surface for engagement with the opposite sides of the elements, the said element comprising a rigid metal member provided with a multiplicity of inwardly extending grooves for dirty liquid to be filtered, the said grooves extending from the outer edge but terminating short of a central through conduit in said element, and the said element also having a plurality of outwardly extending filtrate grooves extending from said central through conduit and terminating short of the outer edge of the element, all of the said grooves forming conduits when the discs are stacked in engagement with each other, and the base and the liquid being filtered by passing laterally from the dirty liquid grooves to the filtrate grooves, the said element being circular in shape and formed at its center with a through bore for receiving a supporting member for the stack, the said through bore communicating with a groove at its side, and the said groove constituting the through conduit of the element previously mentioned.

6. In a filter element for filtering liquid fuel or the like, a rigid, flat member provided with one plane side and provided on its opposite side with an annular land adjacent the center and another annular land adjacent the outer edge, these annular lands projecting a distance a few thousands of an inch and determining the spacing of the upper plane surface of the element from the lower plane surface of another element, one of said surfaces being also provided with a multiplicity of inwardly extending grooves extending from the outer edge of said element and terminating short of an annular recess about the center of said element, others of said grooves extending from said annular recess outwardly and terminating short of the outer edge of said element, the liquid to be filtered going along one set of grooves and passing laterally to the other set of grooves between plane surfaces, the spacing of which is determined by said lands.

7. In a filter assembly, the combination of a housing having a base and a cover, the cover fitting against the base to form a closed chamber and the said base having an inlet communicating with the space inside the cover, and an outlet, the said outlet communicating with a central liquid collection groove on said base, a supporting member carried by said base and a stack of rigid filter elements carried by said base, the said filter elements being formed with one plane side and one radially grooved side, and the said elements each having a central filtrate collecting recess communicating with said outlet, the radial grooves alternately comprising a groove communicating with the collecting recess and another groove communicating with the space surrounding the stack of elements so that the liquid to be filtered enters the grooves and passes laterally from the grooves to the next adjacent groove communicating with the outlet.

8. In a high pressure filter for use between the high pressure outlet of an oil burner pump and an atomizing nozzle, the combination of a housing having an inlet port and an outlet port, the said housing having a filter chamber communicating with the inlet port, a stack of rigid filter elements located in said filter chamber and having the edges of the filter elements accessible to liquid from the inlet, the said stack having a centrally extending conduit blocked at one end and communicating with the outlet at the other end, and the said elements having extending inwardly from the outer surface of the stack a plurality of grooves on one face of each element, the grooves terminating short of said central conduit and the grooves forming minute conduits when the filter elements are arranged in a stack, the said filter elements also having grooves which start inwardly of the outer edge of the filter elements and which communicate with said central conduit so that the liquid to be filtered goes in at the first-mentioned grooves and passes laterally between the rigid filter elements to the other grooves and thence to the outlet, the edges of said grooves forming the places at which solid materials are filtered from the liquid.

9. In a filter element assembly, the combination of a plurality of rigid plates, the said plates being provided with plane surfaces on both sides, and the plane surfaces of one side of each plate being provided with a multiplicity of inwardly extending minute grooves terminating short of a centrally located filtrate conduit passing through said plates, the said grooves extending to the edge of the plates, and when the plates are stacked the said grooves forming apertures for receiving liquid to be filtered, and each of said plates having a land projecting from one of the said plane surfaces and extending around the border of said plate to engage the other side of the next adjacent plate and to determine the spacing of the plane surfaces of the plates from each other, the liquid to be filtered passing in at said grooves from the edges of said plates, and the solids being removed from the liquid at the edges of said grooves, the filtrate then being sufficiently clean to pass between the plane surfaces to said filtrate conduit.

WILLIAM W. HALLINAN.

REFERENCES CITED

The following references are of record in the file of this patent:

UNITED STATES PATENTS

| Number | Name | Date |
| --- | --- | --- |
| 1,335,899 | Kahlenberg | Apr. 6, 1920 |
| 1,456,438 | Hesselman | May 22, 1923 |
| 1,459,925 | Olin | June 26, 1923 |
| 1,646,404 | Herbert | Oct. 25, 1927 |
| 1,677,892 | Herbert et al. | July 24, 1928 |
| 2,063,742 | Holmes | Dec. 8, 1936 |
| 2,263,913 | Bargeboer | Nov. 25, 1941 |
| 2,286,581 | Scott | June 16, 1942 |
| 2,445,269 | Hoffer | July 13, 1948 |
| 2,459,376 | Hallinan | Jan. 18, 1949 |